(12) United States Patent
Angleton et al.

(10) Patent No.: US 9,304,891 B1
(45) Date of Patent: Apr. 5, 2016

(54) LOAD-TEST GENERATOR

(71) Applicant: INTUIT INC., Mountain View, CA (US)

(72) Inventors: Denis G. Angleton, La Mesa, CA (US); Antonio J. Hernandez, Chula Vista, CA (US); Noah W. Patterson, San Diego, CA (US); Alfredo Martinez, Anaheim, CA (US); Ibrar Malik, Mountain View, CA (US)

(73) Assignee: INTUIT INC., Mountain View, CA (US)

( * ) Notice: Subject to any disclaimer, the term of this patent is extended or adjusted under 35 U.S.C. 154(b) by 79 days.

(21) Appl. No.: 14/071,479

(22) Filed: Nov. 4, 2013

(51) Int. Cl.
  *G06F 11/00* (2006.01)
  *G06F 11/36* (2006.01)
  *G06F 11/34* (2006.01)

(52) U.S. Cl.
  CPC ........ *G06F 11/3668* (2013.01); *G06F 11/3414* (2013.01); *G06F 11/3495* (2013.01); *G06F 11/3684* (2013.01)

(58) Field of Classification Search
  CPC ............ G06F 11/3414; G06F 11/3688; G06F 11/3495; G06F 11/3684; G06F 2201/875; G06F 9/4443
  See application file for complete search history.

(56) References Cited

U.S. PATENT DOCUMENTS

| | | | |
|---|---|---|---|
| 7,881,439 B1* | 2/2011 | Cohn et al. | 379/9.03 |
| 2006/0117055 A1* | 6/2006 | Doyle | 707/102 |
| 2009/0100345 A1* | 4/2009 | Miller | 715/738 |
| 2010/0058366 A1* | 3/2010 | Swildens | 719/329 |
| 2012/0246310 A1* | 9/2012 | Broda et al. | 709/224 |
| 2013/0097307 A1* | 4/2013 | Vazac et al. | 709/224 |
| 2013/0191814 A1* | 7/2013 | Fujii et al. | 717/124 |

* cited by examiner

*Primary Examiner* — Charles Ehne
(74) *Attorney, Agent, or Firm* — Patterson + Sheridan, LLP

(57) ABSTRACT

During a test-generation technique, a test session with web flows associated with a set of users and a browser is recorded. Then, the test session is modified to generalize the web flows to a larger set of users. For example, data may be converted into variables, requests may be added or removed, and/or delays may be inserted between requests. In addition, the test session may be filtered using one or more filters to remove: static content, images and/or types of requests. After the test session has been generalized, it can be incorporated into a load test that accurately simulates interactions with multiple users.

18 Claims, 4 Drawing Sheets

100

RECORD A TEST SESSION THAT INCLUDES WEB FLOWS ASSOCIATED WITH A FIRST SET OF USERS AND A BROWSER
110

MODIFY THE WEB FLOWS SO THAT THE WEB FLOWS REPRESENT BEHAVIORS ASSOCIATED WITH A SECOND SET OF USERS
112

FILTER THE TEST SESSION USING ONE OR MORE FILTERS IN A SET OF PREDEFINED FILTERS
(OPTIONAL)
114

INCORPORATE THE MODIFIED TEST SESSION INTO A LOAD TEST
116

US 9,304,891 B1

LOAD-TEST GENERATOR

BACKGROUND

The present disclosure generally relates to techniques for testing of software systems. More specifically, the present disclosure relates to a technique for generating a load test for a software system by monitoring and modifying a test session with first set of users to generalize the test session to a second set of users.

'Load testing' is a common testing technique that is used to model the expected usage of a software program by simulating multiple users or having multiple users access the software program concurrently. Ideally, the testing simulates actual use of the software program (as opposed to using theoretical or analytical modeling) so that the user experience can be assessed and the performance of the computer system (such as a client-server architecture), which is used to execute the software program, can be measured under real-world conditions.

In practice, it is often difficult to simulate actual use of the software program during load testing. In particular, while test scripts for use in a load test can be obtained by monitoring the interactions of a set of users with the software program, it is often difficult to generalize these test scripts so that they are more representative of the much larger number of users that typically use the software product. Consequently, in order to obtain an accurate load test, the interactions of a very large number of users with the software product may be needed, which is often time-consuming, complicated and expensive.

SUMMARY

The disclosed embodiments relate to a computer system that generates a load test. During operation, the computer system records a test session that includes web flows associated with a first set of users and a browser. Then, the computer system modifies the test session so that the web flows represent behaviors associated with a second set of users, where the second set of users includes more users than the first set of users, and modifying the test session generalizes the web flows. Next, the computer system incorporates the modified test session into the load test.

Note that the web flows may be data driven and/or may be user-specific. Moreover, the web flows may include inbound traffic and outbound traffic between the browser on a client and a server.

Furthermore, the test session may be associated with: interaction of the first set of users with the browser, and/or interaction of a test tool, which simulates the first set of users, with the browser. Note that the test session may have an extensible-markup-language (XML) format.

In some embodiments, modifying the test session involves: converting data into variables, adding requests, removing requests, inserting delays between requests, and/or extracting data from responses. Additionally, the computer system may filter the test session using one or more filters in a set of predefined filters. This filtering may involve: removing static content, removing images, and/or removing types of requests based on attributes associated with the requests and responses.

Another embodiment provides a method that includes at least some of the operations performed by the computer system.

Another embodiment provides a computer-program product for use with the computer system. This computer-program product includes instructions for at least some of the operations performed by the computer system.

BRIEF DESCRIPTION OF THE FIGURES

Note that like reference numerals refer to corresponding parts throughout the drawings. Moreover, multiple instances of the same part are designated by a common prefix separated from an instance number by a dash.

DETAILED DESCRIPTION

Embodiments of a computer system, a technique for generating a load test, and a computer-program product (e.g., software) for use with the computer system are described. During this test-generation technique, a test session with web flows associated with a set of users and a browser is recorded. Then, the test session is modified to generalize the web flows to a larger set of users. For example, data may be converted into variables, requests may be added or removed, and/or delays may be inserted between requests. In addition, the test session may be filtered using one or more filters to remove: static content, images and/or types of requests. After the test session has been generalized, it can be incorporated into a load test that accurately simulates interactions with multiple users.

By monitoring and generalizing the test session, the test-generation technique may allow a high-quality load test to be efficiently created. This capability may improve the accuracy of subsequent testing, thereby reducing the incidence of errors or unintended user cases. Moreover, the test-generation technique may improve the quality of software and, thus, the user experience when interacting with the software. Consequently, the test-generation technique may increase customer satisfaction and retention, with a commensurate impact on the revenue of a provider of the software.

In the discussion that follows, a user may include: an individual or a person (for example, an existing customer, a new customer, a service provider, a vendor, a contractor, etc.), an organization, a business and/or a government agency. Furthermore, a 'business' should be understood to include: for-profit corporations, non-profit corporations, organizations, groups of individuals, sole proprietorships, government agencies, partnerships, etc.

Figure 1:
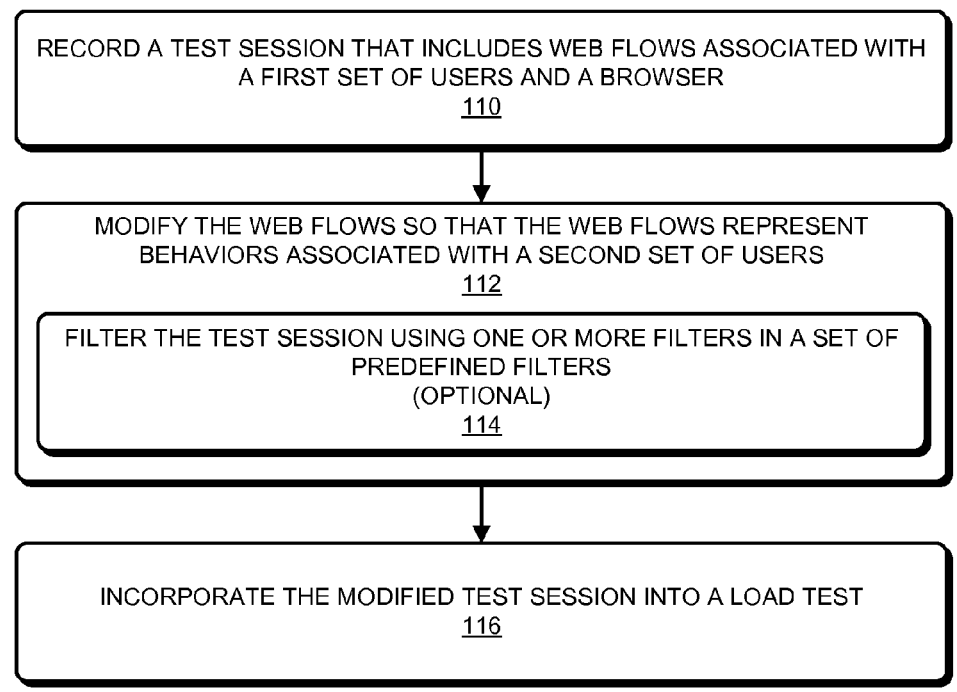
FIG. 1 is a flow chart illustrating a method for generating a load test in accordance with an embodiment of the present disclosure.

We now describe embodiments of the test-generation technique that monitors and generalizes test sessions of users. FIG. 1 presents a flow chart illustrating a method 100 for generating a load test, which may be performed by a computer system (such as computer system 400 in FIG. 4). During operation, the computer system records a test session that includes web flows associated with a first set of users and a browser (operation 110). Then, the computer system modifies the test session so that the web flows represent behaviors (or interactions with the browser) associated with a second set of users (operation 112), where the second set of users includes more users than the first set of users, and modifying the test session generalizes the web flows. Next, the computer system incorporates the modified test session into the load test (operation 116).

Note that the web flows may be data driven and/or may be user-specific. Moreover, the web flows may include inbound traffic and outbound traffic between the browser on a client and a server.

Furthermore, the test session may be associated with: interaction of the first set of users with the browser, and/or interaction of a test tool, which simulates the first set of users, with the browser. Note that the test session may have an extensible-markup-language (XML) format.

In some embodiments, modifying the test session involves: converting data into variables, adding requests, removing requests, inserting delays between requests, and/or extracting data from responses. Additionally, the computer system may optionally filter the test session using one or more filters in a set of predefined filters (operation 114). This filtering may involve: removing static content, removing images, and/or removing types of requests based on attributes associated with the requests and responses.

Figure 2:
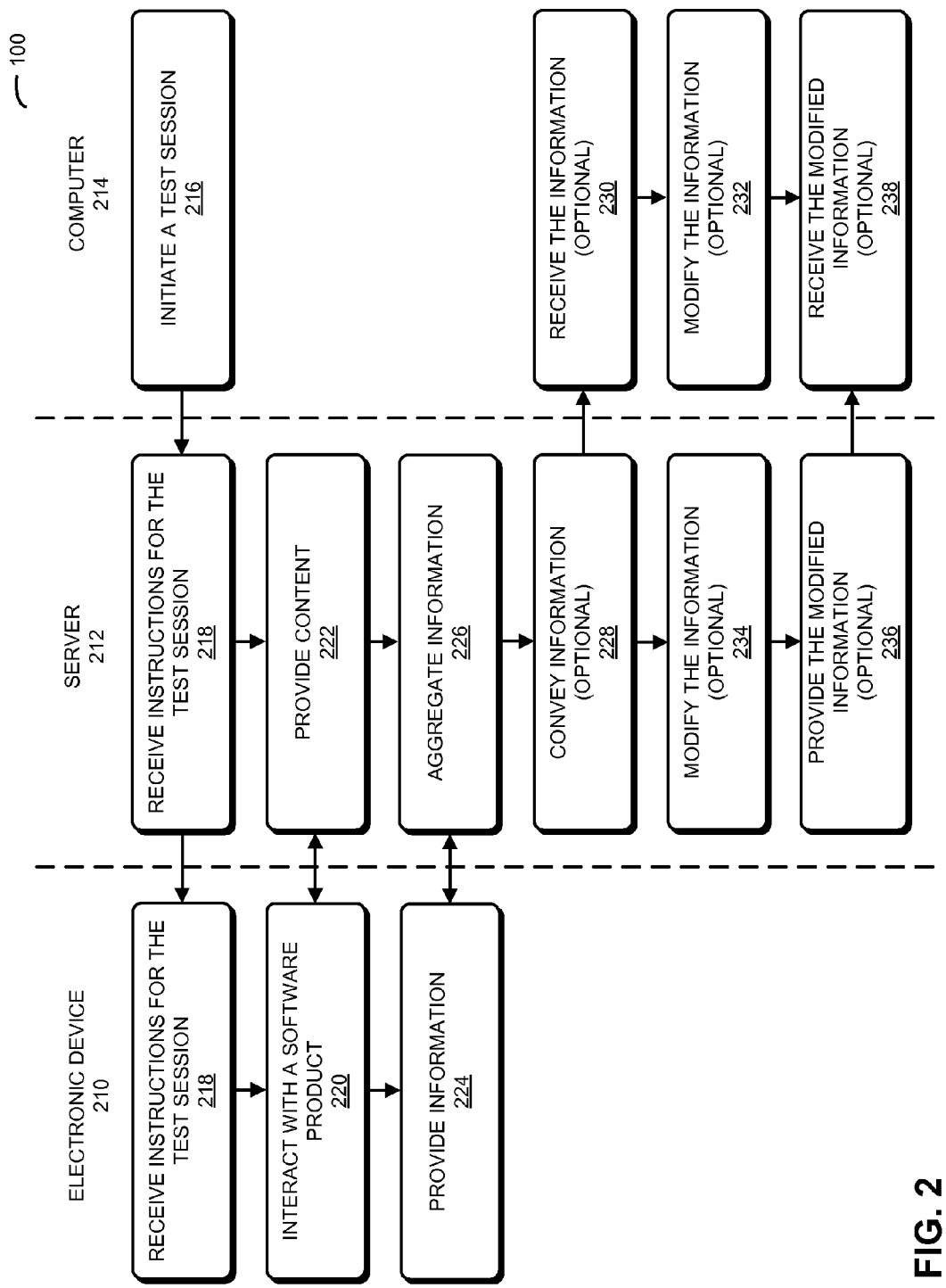
FIG. 2 is a flow chart illustrating the method of FIG. 1 in accordance with an embodiment of the present disclosure.

In an exemplary embodiment, the test-generation technique is implemented using one or more electronic devices (such as a computer or a portable electronic device, e.g., a cellular telephone), a server and a computer, which communicate through a network, such as a cellular-telephone network and/or the Internet (e.g., using a client-server architecture). This is illustrated in FIG. 2, which presents a flow chart illustrating method 100 (FIG. 1).

During the method, computer 214 may initiate a test session (operation 216) with multiple users of electronic devices, such as a user of electronic device 210. These instructions may be received by server 212 and electronic device 210 (operation 218).

During the test session, the user may interact with a software product (operation 220). This interaction may involve inbound and outbound web flows as the user interacts with the software product (such as a browser) that renders content provided by server 212 (operation 222).

Moreover, electronic device 210 may provide (operation 224) and server 212 may aggregate information (operation 226) about the web flows and the performance of the overall system during the test session. This information may be aggregated from multiple users concurrently. Furthermore, the information may be aggregated from electronic device 210 in real-time (during the test session), at the end of the test session, and/or after a time interval has elapsed.

Additionally, server 212 may optionally convey the information (operation 228) to computer 214. For example, the information may be conveyed in real-time (during the test session), at the end of the test session, and/or after a time interval has elapsed. After optionally receiving the information (operation 230), computer 214 may optionally modify the information (operation 232) to generalize the test session.

Alternatively, server 212 may optionally modify the information (operation 234) after or while it is aggregated, and then may optionally provide the modified information (operation 236) to computer 214. The modified information may be optionally received (operation 238) by computer 214.

Next, computer 214 may generate a load test (not shown) using the information about the test session.

In some embodiments of method 100 (FIGS. 1 and 2), there may be additional or fewer operations. Moreover, the order of the operations may be changed, and/or two or more operations may be combined into a single operation.

In an exemplary embodiment, the test-generation technique is used by performance engineers to quickly, easily and repeatably create test scripts to generate load on a system. This capability may be provided by a script recording and ingestion system (which is sometimes referred to as a load-test system') that simplifies and automates these operations. Moreover, this test-generation technique may facilitate more frequent, automated performance testing. In the process, the test-generation technique may allow performance bugs to be identified earlier in the development process, which may result in cost savings. Furthermore, the reduction in human effort or interaction when manipulating test scripts for use in load tests may improve the accuracy of the testing results and may also result in cost savings.

The load-test system may use a recording proxy to capture web traffic at the browser level. These transactions may then be filtered and output as a document having an extensible-markup-language (XML) format. This document can be uploaded to the load-test system, where filters can be selected to modify the captured web traffic to create a test script. These manipulations can variablize parts of the test script, such as the: request, add assertions of validity, add instructions to extract data from the responses for use in future requests or validation, add/remove requests, insert delays between requests, etc. Then, the test script may be further modified, as needed, by one or more of the performance engineers, and may be subsequently used in load tests.

For example, during the test-generation technique, a user may record a test scenario using the recording proxy and save the output to a file. For example, the recording proxy may capture inbound and outbound HTTP traffic between the client browser and the server. Because the web flows are data driven and may change based on the user, the recorded test scenario may not be representative of the behaviors and interactions that occur in an environment with multiple users.

To address this problem, the user may use a controller in the load-test system to create a new test script by selecting the file they just recorded and the filters they wish to apply to the ingested data to generalize it to multiple users. This filtering may remove static content (such as a domain name with static content) and images, and/or may use pattern recognition to remove certain types of request (e.g., based on the attributes of the requests-responses). After the test script has been transformed, it may be made available to the user for further manipulation or modification via a user interface in the load-test system or for use in subsequent load tests.

As noted previously, the load-test system may provide an end-to-end system for recording, filtering, and modification. These features can be automated and may be driven without human intervention. Consequently, the web flows that are recorded by the recording proxy may represent the interactions of one or more users with the browser or may represent the interactions of simulated users with the browser (e.g., an automation tool may simulate the interactions of the users).

In an exemplary embodiment, at least a portion of the load-test system, such as the recording proxy, is implemented in a cloud-based system so that data associated with a test session involving multiple users or simulated users can be acquired.

Figure 3:
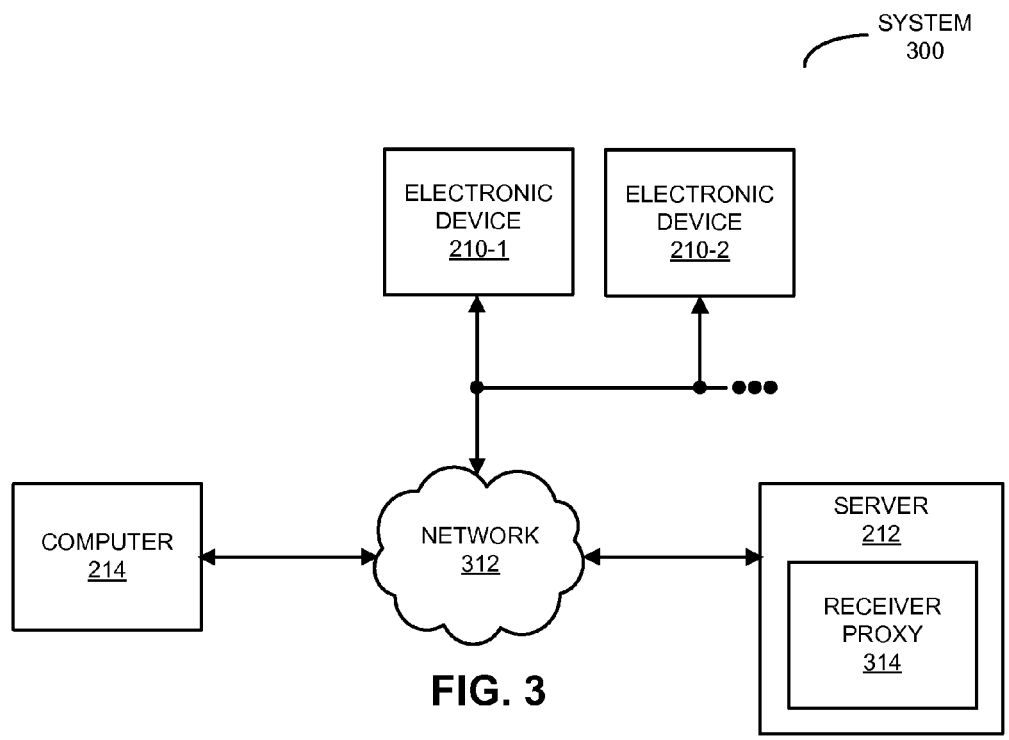
FIG. 3 is a block diagram illustrating a system that performs the method of FIGS. 1 and 2 in accordance with an embodiment of the present disclosure.

We now describe embodiments of a system and the computer system, and their use. FIG. 3 presents a block diagram illustrating a system 300 that can be used, in part, to perform operations in method 100 (FIGS. 1 and 2). In this system, during the test-generation technique one or more users of the one or more electronic devices 210 may use a software product, such as a software application that is resident on and that executes on one or more electronic devices 210. (Alternatively, the one or more users may interact with a web page that is provided by server 212 via network 312, and which is rendered by a web browser on the one or more electronic devices 210. For example, at least a portion of the software application may be an application tool that is embedded in the web page, and which executes in a virtual environment of the web browser. Thus, the application tool may be provided to the user via a client-server architecture.) This software application may be a standalone application or a portion of another application that is resident on and which executes on the one or more electronic devices 210 (such as a software application that is provided by server 212 or that is installed and which executes on the one or more electronic devices 210).

During the test-generation technique, the one or more users may use the software application during a test session. In particular, server 212 may provide content to and receive content from the software application (such as a browser) via network 312. The users may interact with the software application, which may result in requests and responses being provided and received from server 212 via network 312. Recording proxy 314 in server 212 may capture the inbound and outbound web flows via network 312 as the users interact with the software application. In this way, server 212 may aggregate information about the web flows and the performance of the overall system during the test session.

Subsequently, server 212 may optionally convey the aggregated information to computer 214 via network 312. After optionally receiving the information, computer 214 may optionally modify the information (e.g., by performing filtering using one or more predefined filters that are selected by an operator of computer 214) to generalize the test session.

Alternatively, server 212 may optionally modify the aggregated information, and then may optionally provide the modified information to computer 214 via network 312. Note that the modified aggregated information is sometimes referred to as a 'test script.'

Then, computer 214 may make the test script available for subsequent use in a load test. If an operator of computer 214 selects the test script, computer 214 may generate a load test that includes the test script.

Note that information in system 300 may be stored at one or more locations in system 300 (i.e., locally or remotely). Moreover, because this data may be sensitive in nature, it may be encrypted. For example, stored data and/or data communicated via network 312 may be encrypted.

Figure 4:
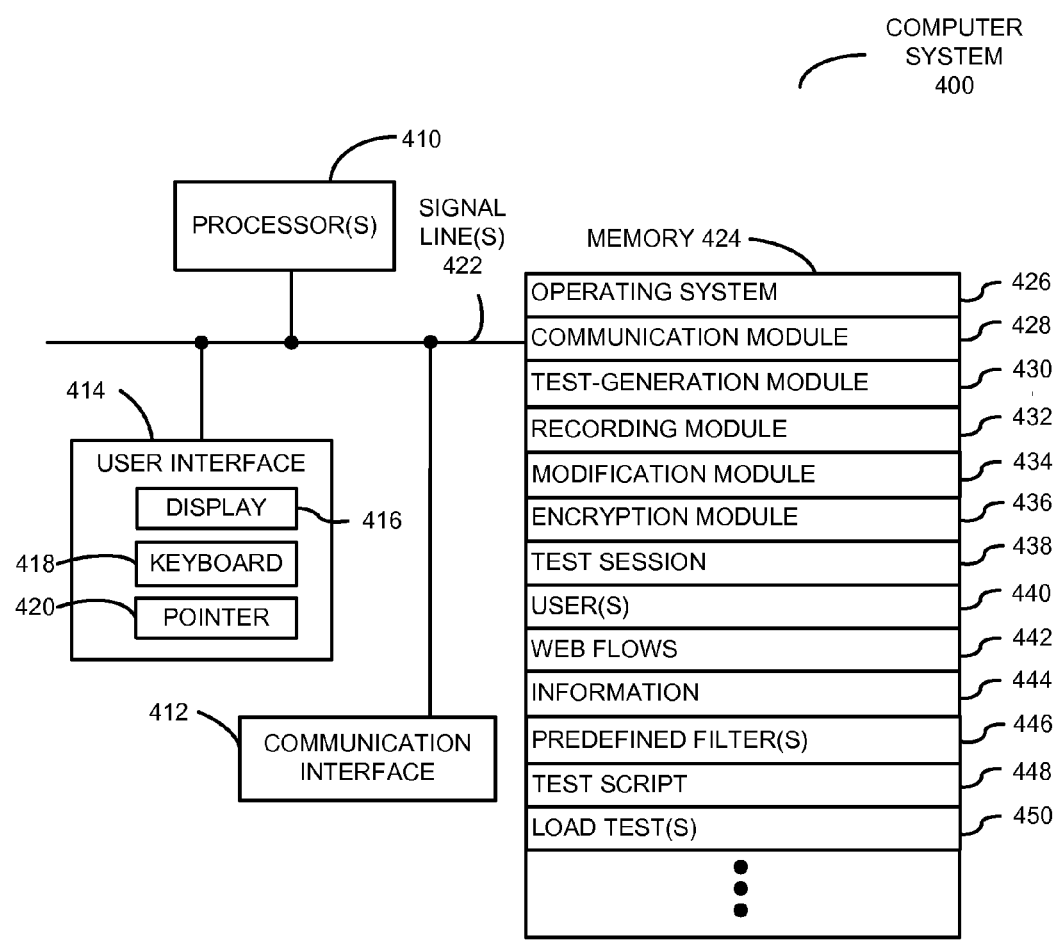
FIG. 4 is a block diagram illustrating a computer system that performs the method of FIGS. 1 and 2 in accordance with an embodiment of the present disclosure.

FIG. 4 presents a block diagram illustrating a computer system 400 that performs method 100 (FIGS. 1 and 2), such as server 212 (FIGS. 2 and 3). Computer system 400 includes one or more processing units or processors 410, a communication interface 412, a user interface 414, and one or more signal lines 422 coupling these components together. Note that the one or more processors 410 may support parallel processing and/or multi-threaded operation, the communication interface 412 may have a persistent communication connection, and the one or more signal lines 422 may constitute a communication bus. Moreover, the user interface 414 may include: a display 416, a keyboard 418, and/or a pointer 420, such as a mouse.

Memory 424 in computer system 400 may include volatile memory and/or non-volatile memory. More specifically, memory 424 may include: ROM, RAM, EPROM, EEPROM, flash memory, one or more smart cards, one or more magnetic disc storage devices, and/or one or more optical storage devices. Memory 424 may store an operating system 426 that includes procedures (or a set of instructions) for handling various basic system services for performing hardware-dependent tasks. Memory 424 may also store procedures (or a set of instructions) in a communication module 428. These communication procedures may be used for communicating with one or more computers and/or servers, including computers and/or servers that are remotely located with respect to computer system 400.

Memory 424 may also include multiple program modules (or sets of instructions), including: test-generation module 430 (or a set of instructions), recording module 432 (or a set of instructions), modification module 434 (or a set of instructions) and/or encryption module 436 (or a set of instructions). Note that one or more of these program modules (or sets of instructions) may constitute a computer-program mechanism.

During the test-generation technique, test-generation module 430 may conduct test session 438 with one or more users 440 (or simulated users) of one or more electronic devices (such as remote computers) using communication module 428 and communication interface 412. This may involve receiving requests and sending responses (including content) to the one or more electronic devices. In the process, recording module 432 may capture inbound and outbound web flows 442, and may aggregate information 444 about web flows 442 and the performance of computer system 400 during test session 438.

Subsequently, modification module 434 may generalize aggregated information 444 by performing filtering using one or more predefined filters 446 that are selected by an operator of computer system 400 to generalize test session 438. In this way, modification module 434 may create a test script 448, which may be used by test-generation module 430 to generate one or more load tests 450.

Because information used in the test-generation technique may be sensitive in nature, in some embodiments at least some of the data stored in memory 424 and/or at least some of the data communicated using communication module 428 is encrypted or decrypted using encryption module 436.

Instructions in the various modules in memory 424 may be implemented in: a high-level procedural language, an object-oriented programming language, and/or in an assembly or machine language. Note that the programming language may be compiled or interpreted, e.g., configurable or configured, to be executed by the one or more processors 410.

Although computer system 400 is illustrated as having a number of discrete items, FIG. 4 is intended to be a functional description of the various features that may be present in computer system 400 rather than a structural schematic of the embodiments described herein. In some embodiments, some or all of the functionality of computer system 400 may be implemented in one or more application-specific integrated circuits (ASICs) and/or one or more digital signal processors (DSPs).

Computer system 400, as well as electronic devices, computers and servers in system 400, may include one of a variety of devices capable of manipulating computer-readable data or communicating such data between two or more computing systems over a network, including: a personal computer, a laptop computer, a tablet computer, a mainframe computer, a portable electronic device (such as a cellular telephone or PDA), a server, a point-of-sale terminal and/or a client computer (in a client-server architecture). Moreover, network 312 (FIG. 3) may include: the Internet, World Wide Web (WWW), an intranet, a cellular-telephone network, LAN, WAN, MAN, or a combination of networks, or other technology enabling communication between computing systems.

Electronic devices 210 (FIGS. 2 and 3), server 212 (FIGS. 2 and 3), computer 214 (FIGS. 2 and 3), system 300 (FIG. 3), and/or computer system 400 may include fewer components or additional components. Moreover, two or more components may be combined into a single component, and/or a position of one or more components may be changed. In some embodiments, the functionality of electronic devices 210 (FIGS. 2 and 3), server 212 (FIGS. 2 and 3), computer 214 (FIGS. 2 and 3), system 300 (FIG. 3) and/or computer system 400 may be implemented more in hardware and less in software, or less in hardware and more in software, as is known in the art.

In the preceding description, we refer to 'some embodiments.' Note that 'some embodiments' describes a subset of all of the possible embodiments, but does not always specify the same subset of embodiments.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. A computer-implemented method for generating a load test, the method comprising:
   using the computer, recording a test session that includes web flows associated with a first set of users and a browser;
   modifying the test session so that the web flows represent behaviors associated with a second set of users, wherein the second set of users includes more users than the first set of users, and wherein modifying the test session generalizes the web flows;
   filtering the test session using one or more filters in a set of predefined filters; and
   incorporating the modified test session into the load test.

2. The method of claim 1, wherein the web flows are data driven.

3. The method of claim 1, wherein the web flows are user-specific.

4. The method of claim 1, wherein the web flows include inbound traffic and outbound traffic between the browser on a client and a server.

5. The method of claim 1, wherein the test session has an extensible-markup-language (XML) format.

6. The method of claim 1, wherein modifying the test session involves an operation including: converting data into variables, adding requests, removing requests, inserting delays between requests, and extracting data from responses.

7. The method of claim 1, wherein the filtering further performs an operation including one of: removing static content, removing images, and removing types of requests based on attributes associated with the requests and responses.

8. The method of claim 1, wherein the test session is associated with one of: interaction of the first set of users with the browser, and interaction of a test tool, which simulates the first set of users, with the browser.

9. A computer-program product for use in conjunction with a computer system, the computer-program product comprising a non-transitory computer-readable storage medium and a computer-program mechanism embedded therein to generate a load test, the computer-program mechanism including:
   instructions for recording a test session that includes web flows associated with a first set of users and a browser;
   instructions for modifying the test session so that the web flows represent behaviors associated with a second set of users, wherein the second set of users includes more users than the first set of users, and wherein modifying the test session generalizes the web flows;
   instructions for filtering the test session using one or more filters in a set of predefined filters; and
   instructions for incorporating the modified test session into the load test.

10. The computer-program product of claim 9, wherein the web flows are data driven.

11. The computer-program product of claim 9, wherein the web flows are user-specific.

12. The computer-program product of claim 9, wherein the web flows include inbound traffic and outbound traffic between the browser on a client and a server.

13. The computer-program product of claim 9, wherein the test session has an extensible-markup-language (XML) format.

14. The computer-program product of claim 9, wherein modifying the test session involves an operation including: converting data into variables, adding requests, removing requests, inserting delays between requests, and extracting data from responses.

15. The computer-program product of claim 9, wherein the filtering performs an operation including one of:
   removing static content, removing images, and removing types of requests based on attributes associated with the requests and responses.

16. The computer-program product of claim 9, wherein the test session is associated with one of: interaction of the first set of users with the browser, and interaction of a test tool, which simulates the first set of users, with the browser.

17. A computer system, comprising:
   a processor;
   memory; and
      a program module, wherein the program module is stored in the memory and configurable to be executed by the processor to generate a load test, the program module including:
   instructions for recording a test session that includes web flows associated with a first set of users and a browser;
   instructions for modifying the test session so that the web flows represent behaviors associated with a second set of users, wherein the second set of users includes more users than the first set of users, and wherein modifying the test session generalizes the web flows;
   instructions for filtering the test session using one or more filters in a set of predefined filters; and
   instructions for incorporating the modified test session into the load test.

18. The computer system of claim 17, wherein modifying the test session involves an operation including: converting data into variables, adding requests, removing requests, inserting delays between requests, and extracting data from responses.

* * * * *